(12) United States Patent
Izumi et al.

(10) Patent No.: US 8,045,948 B2
(45) Date of Patent: *Oct. 25, 2011

(54) RECEIVING APPARATUS, PROGRAM AND RECEIVING METHOD

(75) Inventors: Seiichi Izumi, Kanagawa (JP); Hiroaki Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 725 days.

This patent is subject to a terminal disclaimer.

(21) Appl. No.: 12/128,007

(22) Filed: May 28, 2008

(65) Prior Publication Data
US 2008/0299928 A1 Dec. 4, 2008

(30) Foreign Application Priority Data

May 31, 2007 (JP) ................. P2007-146067
Apr. 7, 2008 (JP) ................. P2008-099260

(51) Int. Cl.
*H04B 1/10* (2006.01)
*H04K 3/00* (2006.01)
(52) U.S. Cl. ...................... 455/306; 455/307
(58) Field of Classification Search .............. 455/203, 455/306–307; 375/321, 343–344
See application file for complete search history.

(56) References Cited

U.S. PATENT DOCUMENTS

| | | | | |
|---|---|---|---|---|
| 6,477,196 | B1 * | 11/2002 | Swanke et al. | 375/147 |
| 7,729,679 | B1 * | 6/2010 | Lee | 455/295 |
| 2008/0298517 | A1 * | 12/2008 | Izumi et al. | 375/344 |

* cited by examiner

*Primary Examiner* — Lee Nguyen
(74) *Attorney, Agent, or Firm* — Finnegan, Henderson, Farabow, Garrett & Dunner, L.L.P.

(57) ABSTRACT

A receiving apparatus includes a receiving portion to receive a radio signal generated based on one baseband signal of a baseband signal having a prescribed frequency band and a baseband signal having a partial frequency band being a part of the prescribed frequency band, a signal processing portion to generate the baseband signal by converting a frequency of the radio signal, a filter portion to output a plurality of partial signals, each having a frequency component of each partial frequency band extracted from the baseband signal generated by the signal processing portion, and an analysis portion to analyze characteristics of each partial signal of the plurality of partial signals output from the filter portion.

10 Claims, 13 Drawing Sheets

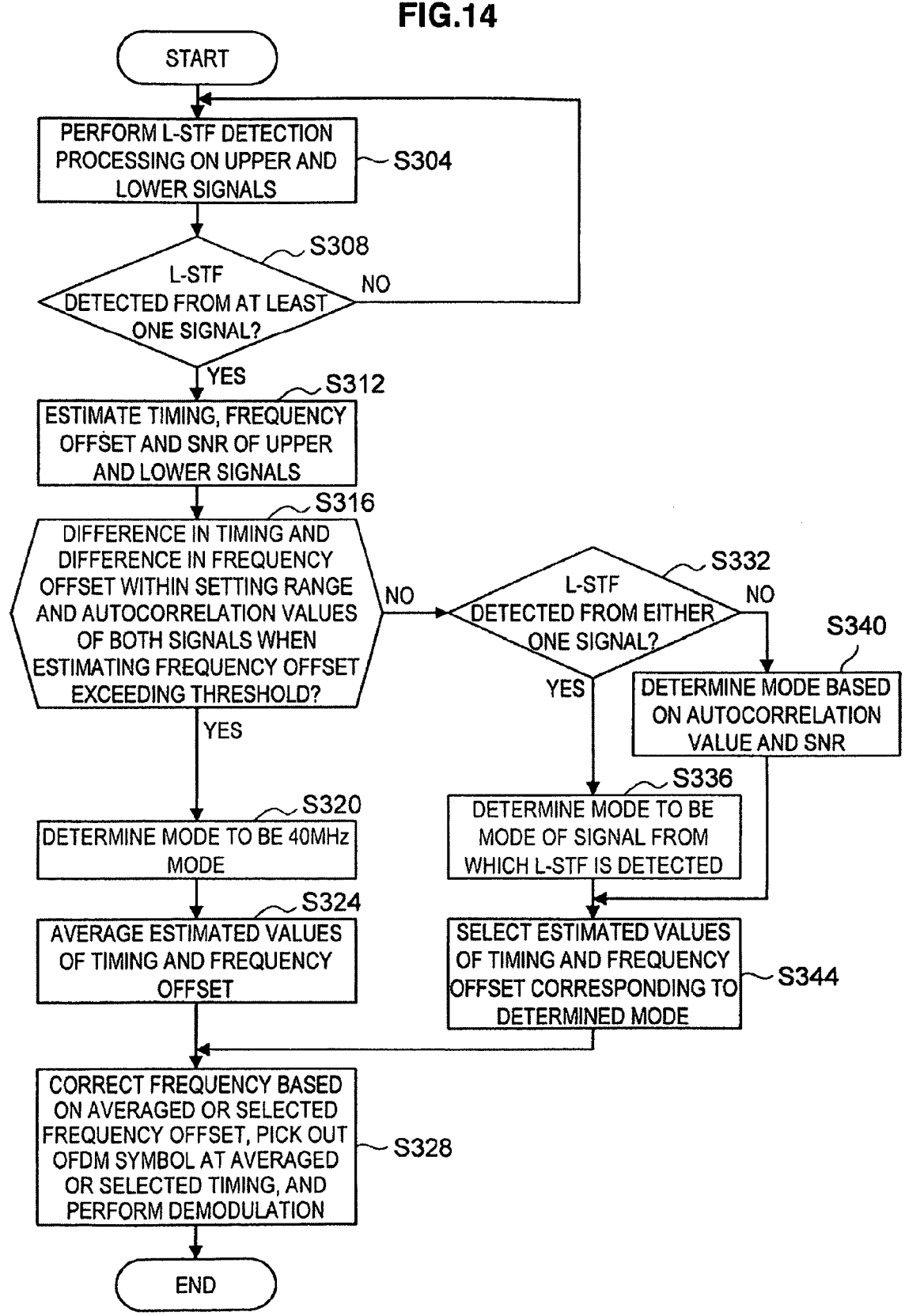

RECEIVING APPARATUS, PROGRAM AND RECEIVING METHOD

CROSS REFERENCES TO RELATED APPLICATIONS

The present invention contains subject matter related to Japanese Patent Application 2007-146067 filed in the Japanese Patent Office on May 31, 2007 and Japanese Patent Application 2008-099260 filed Apr. 7, 2008, the entire contents of which being incorporated herein by reference.

BACKGROUND OF THE INVENTION

1. Field of the Invention

The present invention relates to a receiving apparatus, a program and a receiving method.

2. Description of the Related Art

A wireless communication system based on the IEEE (Institute of Electrical and Electronic Engineers) 802.11 standards has been widespread. A wireless communication apparatus such as a transmitting apparatus and a receiving apparatus which constitute such a wireless communication system is more advantageous than a wired communication system in that it has a high degree of flexibility such as portability.

The IEEE 802.11n standard assumes, as a band mode to be used for wireless communication, a 20 MHz mode, a 40 MHz mode, a mode using 20 MHz in the upper half of the 40 MHz mode (40 MHz Upper mode), or a mode using 20 MHz in the lower half of the 40 MHz mode (40 MHz Lower mode) as described in International Patent Publication No. WO2006/020520.

Thus, when a receiving apparatus receives a radio signal, it is necessary to determine which band mode the received radio signal corresponds to and perform demodulation according to the relevant band mode. It is also necessary for the receiving apparatus to estimate demodulation information such as frequency offset and timing which are used for the demodulation based on the received radio signal.

SUMMARY OF THE INVENTION

However, because a radio signal is affected by fading, for example, there has been a concern whether the receiving apparatus can appropriately perform the processing of determining a band mode, estimating demodulation information and so on. For example, the accuracy of estimating the demodulation information of a radio signal in the 40 MHz mode can be degraded due to the effect of a frequency band with a low SNR (Signal-to-Noise Ratio). Further, a band mode can be erroneously determined to be the 40 MHz Upper/Lower mode when receiving a radio signal in the 40 MHz mode.

In light of the foregoing, there is a need for new, improved receiving apparatus, program and receiving method which enable more appropriate processing of a received radio signal.

According to an embodiment of the present invention, there is provided a receiving apparatus including a receiving portion to receive a radio signal generated based on one baseband signal of a baseband signal having a prescribed frequency band and a baseband signal having a partial frequency band being a part of the prescribed frequency band, a signal processing portion to generate the baseband signal by converting a frequency of the radio signal, a filter portion to output a plurality of partial signals, each having a frequency component of each partial frequency band extracted from the baseband signal generated by the signal processing portion, and an analysis portion to analyze characteristics of each partial signal of the plurality of partial signals output from the filter portion.

In this configuration, the signal processing portion generates the baseband signal by converting the frequency of the radio signal, the filter portion outputs partial signals by extracting a frequency component of each partial frequency band from the baseband signal, and the analysis portion analyzes each partial signal. Thus, when the signal processing portion generates the baseband signal having the prescribed frequency band, the analysis portion analyzes the baseband signal not as one whole signal but for each partial signal or each partial frequency band that is included in the prescribed frequency band.

In the above receiving apparatus, the analysis portion may analyze demodulation information of each partial signal of the plurality of partial signals, the demodulation information to be used for demodulation of the baseband signal in a demodulator, and the receiving apparatus may further include a determination portion to determine that the baseband signal generated by the signal processing portion is a baseband signal having the prescribed frequency band if a difference in the demodulation information of the plurality of partial signals analyzed by the analysis portion is within a setting range.

If the difference in the demodulation information, such as a frequency offset and a timing, of the partial signals which are analyzed by the analysis portion is within a setting range, it is likely that the baseband signal which generated by the signal processing portion is in one whole unit. Therefore, the determination portion can appropriately determine that the baseband signal which is generated by the signal processing portion is a baseband signal having the prescribed frequency band when a difference in the demodulation information of the plurality of partial signals analyzed by the analysis portion is within a setting range.

The above receiving apparatus may further include a calculation portion to calculate demodulation information of the baseband signal having the prescribed frequency band by averaging the demodulation information of the plurality of partial signals analyzed by the analysis portion.

In the above receiving apparatus, the analysis portion may further analyze a SNR of each partial signal, and the receiving apparatus may further include a calculation portion to calculate demodulation information of the baseband signal having the prescribed frequency band by assigning a higher weight to the demodulation information of the plurality of partial signals analyzed by the analysis portion as a partial signal has a higher SNR. The reliability of the demodulation information which is estimated from the partial signal in the frequency band having a lower SNR is lower than the reliability of the demodulation information which is estimated from the partial signal in the frequency band having a higher SNR. Thus, if the calculation portion calculates the demodulation information of the baseband signal having the prescribed frequency band by assigning a higher weight to the demodulation information of each partial signal with a higher SNR as described above, it is possible to obtain the demodulation information with higher reliability.

In the above receiving apparatus, the analysis portion may be capable of detecting a prescribed synchronizing signal from the partial signal, and the determination portion may determine that the baseband signal generated by the signal processing portion is a baseband signal having the partial frequency band corresponding to one partial signal if a difference in the demodulation information of the plurality of partial signals analyzed by the analysis portion is outside a setting range and a synchronizing signal is detected from the one partial signal only.

In the above receiving apparatus, the analysis portion may further analyze a SNR (Signal-to-Noise Ratio) of each partial signal, and the determination portion may determine a frequency band of the baseband signal generated by the signal processing portion based on the SNR or a latest frequency band determined by the determination portion if a difference in the demodulation information of the plurality of partial signals analyzed by the analysis portion is outside a setting range and a synchronizing signal is detected from two or more partial signals. For example, when a synchronizing signal is detected from two or more partial signals by the analysis portion, the determination portion may determine that the frequency band of the baseband signal is a frequency band corresponding to a partial signal with a higher SNR. Alternatively, when a synchronizing signal is detected from two or more partial signals by the analysis portion, the determination portion may determine that the frequency band of the baseband signal is the frequency band of the baseband signal which is determined most recently.

In the above receiving apparatus, the analysis portion may calculate a frequency offset by analyzing a correlation value of each partial signal with the partial signal before a prescribed time, and the receiving apparatus may further include a determination portion to determine that the baseband signal generated by the signal processing portion is a baseband signal having the prescribed frequency band if each of absolute values of the correlation values or squares of absolute values of the correlation values of the plurality of partial signals exceeds a threshold.

In the above receiving apparatus, the receiving apparatus may further include a calculation portion to calculate a frequency offset of the baseband signal having the prescribed frequency band by assigning a weight according to a square of an absolute value of the correlation value to a frequency offset of each partial signal calculated by the analysis portion if the determination portion determines that each of absolute values of the correlation values or squares of absolute values of the correlation values of the plurality of partial signals exceeds a threshold.

According to another embodiment of the present invention, there is provided a program for causing a computer to serve as a receiving apparatus including a receiving portion to receive a radio signal generated based on one baseband signal of a baseband signal having a prescribed frequency band and a baseband signal having a partial frequency band being a part of the prescribed frequency band, a signal processing portion to generate the baseband signal by converting a frequency of the radio signal, a filter portion to output a plurality of partial signals, each having a frequency component of each partial frequency band extracted from the baseband signal generated by the signal processing portion, and an analysis portion to analyze characteristics of each partial signal of the plurality of partial signals output from the filter portion The above program may cause a computer hardware resource which includes CPU, ROM. RAM or the like to execute the function of the above-described receiving portion, the signal processing portion and the analysis portion or the like. It is thereby possible to allow a computer that implements the program to serve as the above-described receiving apparatus.

According to another embodiment of the present invention, there is provided a receiving method including the steps of receiving a radio signal generated based on one baseband signal of a baseband signal having a prescribed frequency band and a baseband signal having a partial frequency band being a part of the prescribed frequency band, generating the baseband signal by converting a frequency of the radio signal, outputting a plurality of partial signals, each having a frequency component of each partial frequency band extracted from the baseband signal, and analyzing characteristics of each partial signal of the plurality of partial signals.

According to the embodiments of the present invention described above, it is possible to analyze a received radio signal more appropriately.

BRIEF DESCRIPTION OF THE DRAWINGS

FIG. 14 is a flowchart showing the flow of a receiving method which is performed in a wireless communication apparatus according to the third embodiment of the present invention.

DETAILED DESCRIPTION OF THE PREFERRED EMBODIMENTS

Figure 1:
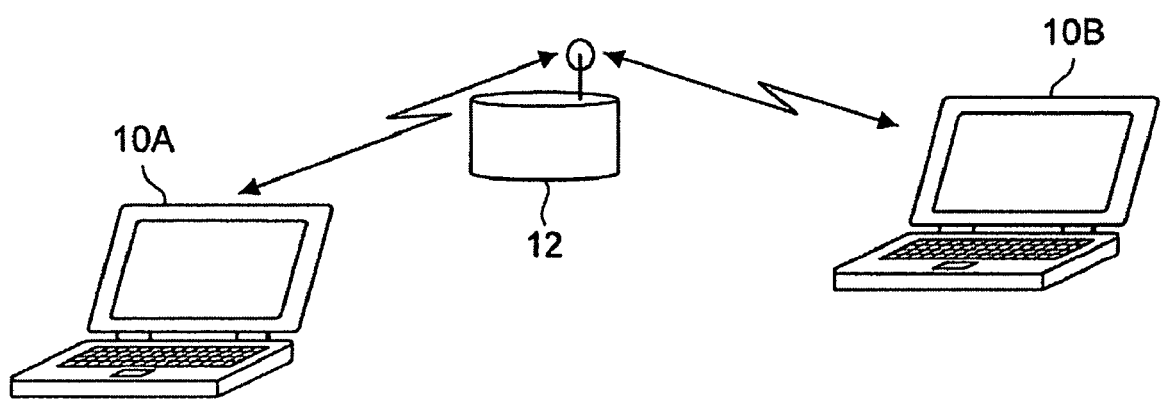
FIG. 1 is an illustration showing an example of the configuration of a wireless communication system according to the first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

FIG. 1 is an illustration showing an example of the configuration of a wireless communication system 1 according to the first embodiment of the present invention. As shown in FIG. 1, the wireless communication system 1 includes a wireless communication apparatus 10A, a wireless communication apparatus 10B, and a base station 12. Hereinafter, the wireless communication apparatus 10A and the wireless communication apparatus 10B are collectively referred to simply as the wireless communication apparatus 10 when there is no particular need to distinguish between them.

The base station 12 is an access point (AP) of a wireless LAN (Local Area Network), for example, and it relays the signal which is communicated by the wireless communication apparatus 10 in the wireless communication system 1. The signal which is communicated by the wireless communication apparatus 10 may be sound data such as music, a lecture and a radio program, video data such as a movie, a television program, a video program, a photograph, a document, a picture and a chart, given data such as game and software, or a given signal for controlling wireless communication, for example.

The wireless communication apparatus 10A and the wireless communication apparatus 10B can transmit and receive a signal through the base station 12. The wireless communication apparatus 10 of this embodiment may perform wireless communication in one band mode of a 20 MHz mode using a bandwidth of 20 MHz, a 40 MHz mode using a prescribed frequency band with a bandwidth of 40 MHz (prescribed frequency band), a 40 MHz Upper mode using a frequency band of 20 MHz in the upper half of 40 MHz (partial frequency band), and a 40 MHz Lower mode using a frequency band of 20 MHz in the lower half of 40 MHz (partial frequency band). The center frequency of a baseband signal in the 20 MHz mode and the 40 MHz mode may be approximately 0 MHz, and the center frequency of a radio signal may be approximately 5 GHz.

Thus, it is necessary for the wireless communication apparatus 10 at the receiving end to accurately determine the band mode of a received signal and demodulate the received signal using a method according to the band mode. However, if a band mode is determined based merely on the presence or absence of a 40 MHz Upper signal and a 40 MHz Lower signal, it can result in erroneous determination. For example, although a normal wireless communication apparatus is supposed to determine that a mode is the 40 MHz mode when both a 40 MHz Upper signal and a 40 MHz Lower signal are detected from a received signal, there is a possibility that both a 40 MHz Upper signal and a 40 MHz Lower signal are received separately. If a band mode is determined erroneously, a receiving process fails to end normally.

In view of the foregoing, the wireless communication apparatus 10 according to the first embodiment of the present invention has been invented. The wireless communication apparatus 10 of the embodiment is capable of determining the band mode of a received signal more accurately. The configuration and the operation of the wireless communication apparatus 10 according to the embodiment are described hereinafter in detail with reference to FIGS. 2 to 8.

Although FIG. 1 shows a PC (Personal Computer) as an example of the wireless communication apparatus 10 having the function of a receiving apparatus, the wireless communication apparatus 10 may be other information processing apparatus such as a home video processing unit (e.g. a DVD recorder, a videocassette recorder etc.), a cellular phone, a PHS (Personal Handyphone System), a portable sound playback unit, a portable video processing unit, a PDA (Personal Digital Assistant), a home game device, a portable game device, and an electrical household appliance.

Further, although FIG. 1 shows the wireless communication system 1 in the infrastructure mode by way of illustration, the wireless communication apparatus 10 may perform autonomous wireless communication in the ad-hoc mode.

Figure 2:
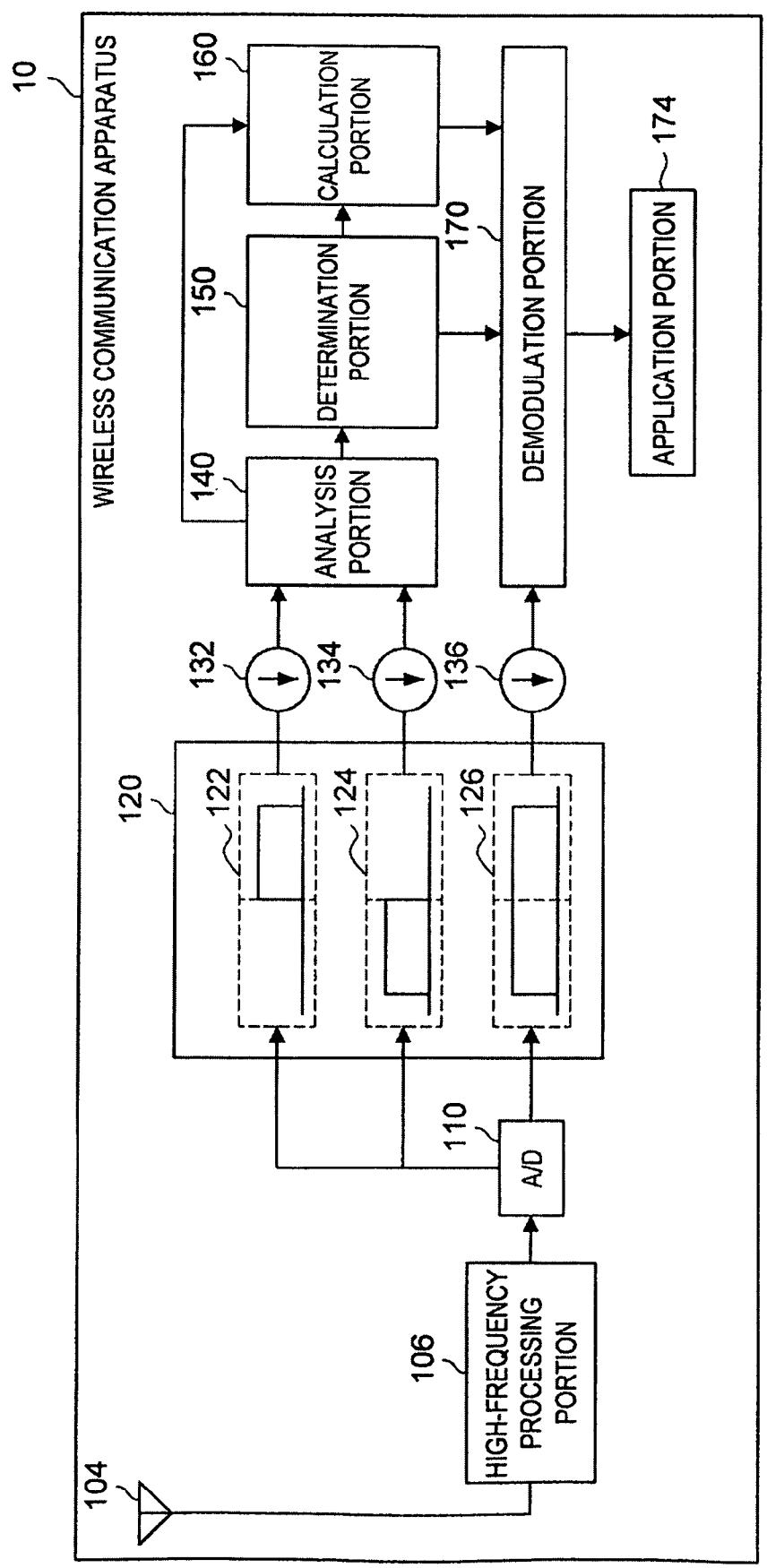
FIG. 2 is a functional block diagram showing the configuration of a wireless communication apparatus according to the embodiment.

FIG. 2 is a functional block diagram showing the configuration of the wireless communication apparatus 10 according to the embodiment. As shown in FIG. 2, the wireless communication apparatus 10 includes an antenna 104, a high-frequency processing portion 106, an A/D conversion portion 110, a filter portion 120, a decimator 132, a decimator 134, a decimator 136, an analysis portion 140, a determination portion 150, a calculation portion 160, a demodulation portion 170 and an application portion 174.

The antenna 104 is an interface with another wireless communication apparatus 10B, and it serves as a receiving portion which receives a given wireless signal from the wireless communication apparatus 10B. For example, the antenna 104 receives a radio signal (orthogonal frequency division multiplex signal) in the 40 MHz mode, the 40 MHz Upper mode or the 40 MHz Lower mode in the wireless communication apparatus 10B.

The high-frequency processing portion 106 serves as a signal processing portion which performs frequency conversion (down conversion) of the radio signal that is received by the antenna 104 to generate an analog baseband signal. The A/D conversion portion 110 converts the analog baseband signal which is generated by the high-frequency processing portion 106 into a digital baseband signal at a sampling rate of 80 MHz, for example.

The filter portion 120 includes an Upper filter 122, a Lower filter 124 and a 40 MHz filter 126. The Upper filter 122 extracts a frequency component of 0 MHz to 20 MHz, which is a frequency band to be used for the 40 MHz Upper mode, from the baseband signal which is output from the A/D conversion portion 110 and outputs it as an Upper signal. Likewise, the Lower filter 124 extracts a frequency component of −20 MHz to 0 MHz, which is a frequency band to be used for the 40 MHz Lower mode, from the baseband signal which is output from the A/D conversion portion 110 and outputs it as a Lower signal. The 40 MHz filter 126 extracts a frequency component of −20 MHz to 20 MHz, which is a frequency band to be used for the 40 MHz mode, from the baseband signal which is output from the A/D conversion portion 110 and outputs it.

Therefore, when the antenna 104 receives a radio signal based on the 40 MHz mode, the filter portion 120 is supposed to output both the Upper signal and the Lower signal. Further, when the antenna 104 receives a radio signal based on the 40 MHz Upper mode, the filter portion 120 is supposed to output the Upper signal only. On the other hand, when the antenna 104 receives a radio signal based on the 40 MHz Lower mode, the filter portion 120 is supposed to output the Lower signal only.

The decimator 132 decimates the Upper signal in such a way that the sampling rate of the Upper signal which is output from the Upper filter 122 becomes 20 MHz or 40 MHz, for example. Likewise, the decimator 134 decimates the Lower signal in such a way that the sampling rate of the Lower signal which is output from the Lower filter 124 becomes 20 MHz or 40 MHz, for example. Further, the decimator 136 decimates the 40 MHz signal in such a way that the sampling rate of the 40 MHz signal which is output from the 40 MHz filter 126 becomes 40 MHz, for example.

The 40 MHz mode, the 40 MHz Upper mode and the 40 MHz Lower mode are described hereinafter with reference to FIGS. 3 to 5.

Figure 3:
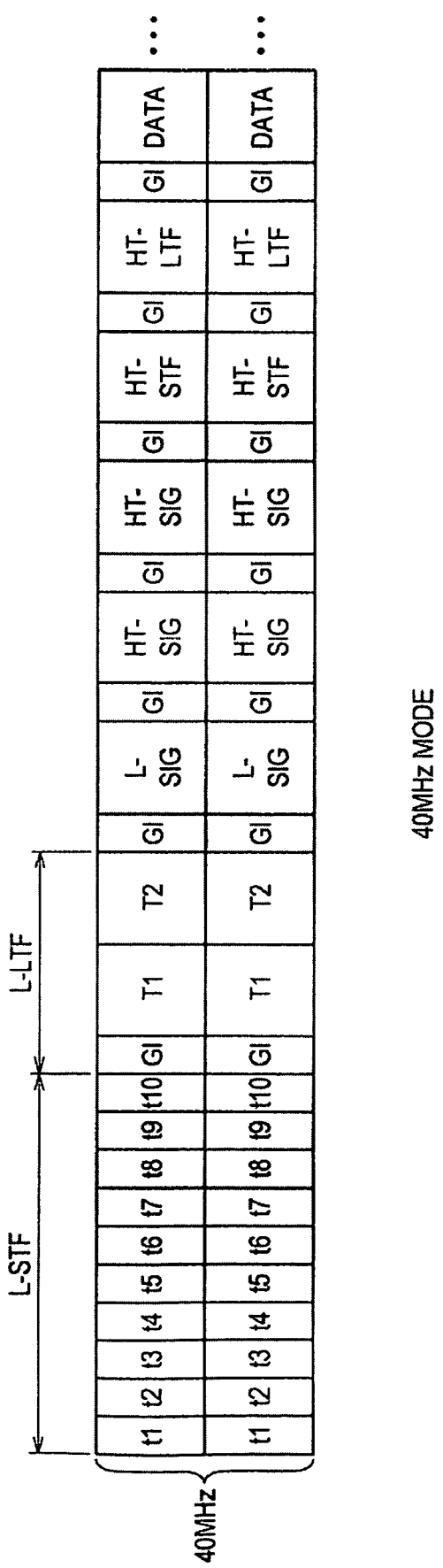
FIG. 3 is an illustration showing an example of a frame format in the 40 MHz mode.

FIG. 3 is an illustration showing an example of a frame format in the 40 MHz mode. In FIG. 3, the vertical direction indicates frequency, and the horizontal direction indicates time. L-STF includes short training symbols t1 to t10 at a frequency of 0.8 μs. The short training symbols t1 to t10 are known fixed pattern, and L-STF serves as a synchronizing signal.

L-LTF includes long training symbols T1 and T2 at a frequency of 3.2 μs. L-LTF is a field which is mainly used for estimating demodulation information such as a frequency offset or a timing to pick out an OFDM symbol in the demodulation portion 170, an SNR and so on. Further, L-LTF serves as a preamble together with L-STF. L-SIG includes information such as a transmission rate or a modulation method of data which is contained in the frame.

Although a band mode may be described in the above L-SIG, this embodiment is advantageous in that the wireless communication apparatus 10 can determine a band mode without waiting for the completion of the analysis of L-SIG.

After L-SIG, the fields that are specific to the IEEE802.11n standard, such as HT-SIG, HT-STF and HT-LTF, are placed, and a data field is placed subsequently.

As shown in FIG. 3, in the 40 MHz mode which uses a bandwidth of 40 MHz as a prescribed frequency band, L-STF, L-LTF, L-SIG, HT-SIG, HT-STF, HT-LTF and a data field are included in both the upper 20 MHz band and the lower 20 MHz band.

Figure 4:
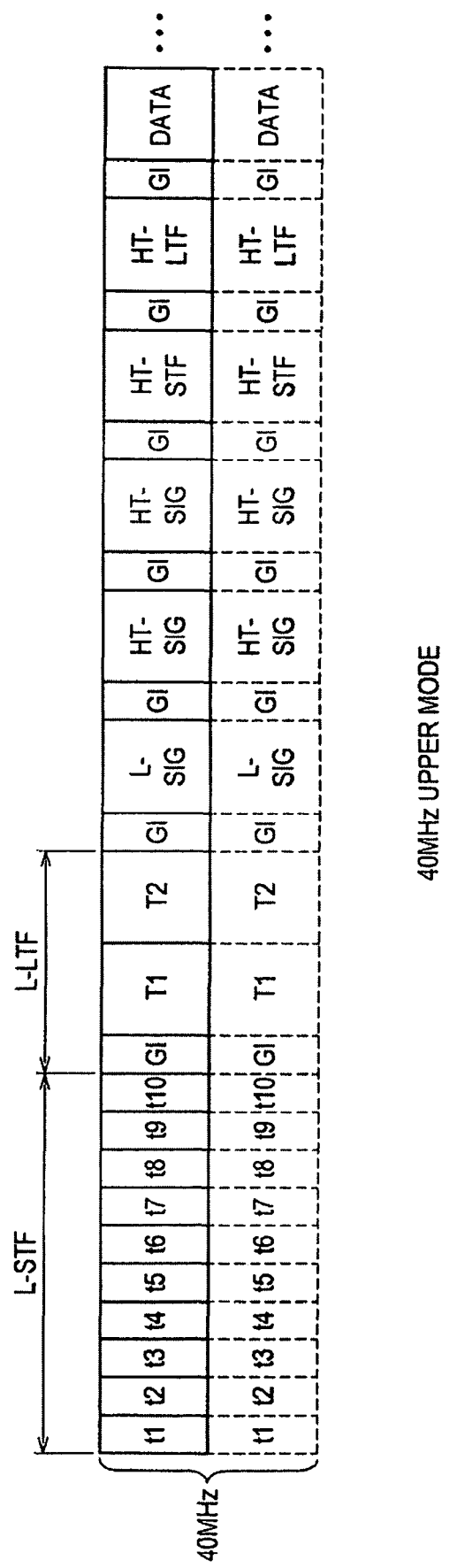
FIG. 4 is an illustration showing an example of a frame format in the 40 MHz Upper mode.

FIG. 4 is an illustration showing an example of a frame format in the 40 MHz Upper mode. Like FIG. 3, the vertical direction indicates frequency, and the horizontal direction indicates time in FIG. 4. As shown in FIG. 4, in the 40 MHz Upper mode, L-STF, L-LTF, L-SIG, HT-SIG, HT-STF, HT-LTF and a data field are included only in the upper 20 MHz frequency band (the region bounded by the full line) of the 40 MHz mode, and the lower 20 MHz frequency band (the region bounded by the dotted line) is not used.

Figure 5:
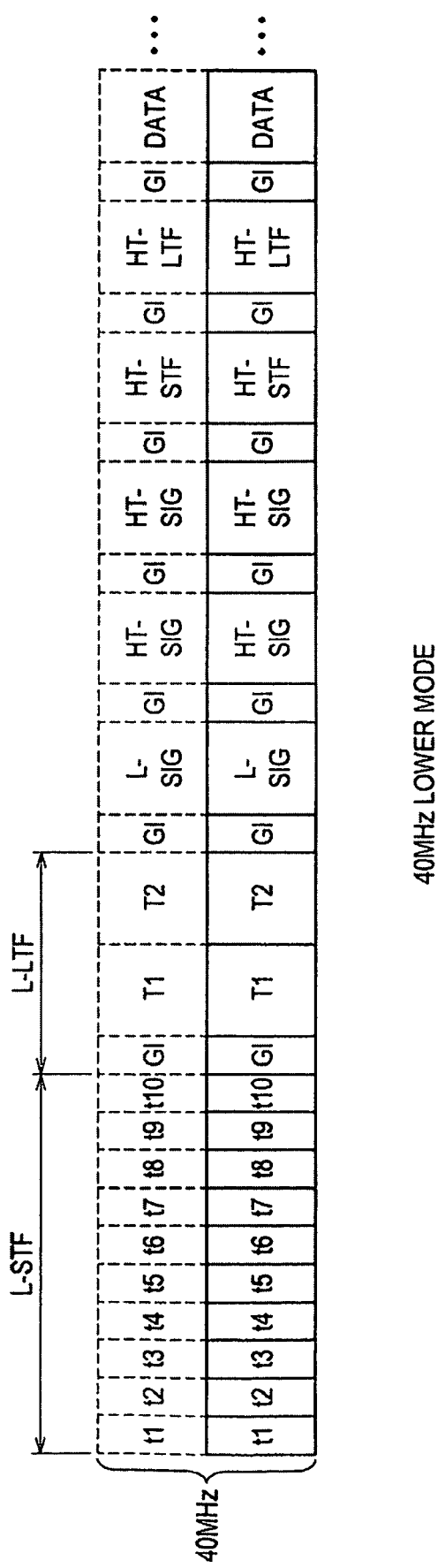
FIG. 5 is an illustration showing an example of a frame format in the 40 MHz Lower mode.

FIG. 5 is an illustration showing an example of a frame format in the 40 MHz Lower mode. Like FIG. 3, the vertical direction indicates frequency, and the horizontal direction indicates time in FIG. 5. As shown in FIG. 5, in the 40 MHz Lower mode, L-STF, L-LTF, L-SIG, HT-SIG, HT-STF, HT-LTF and a data field are included only in the lower 20 MHz frequency band (the region bounded by the full line) of the 40 MHz mode, and the upper 20 MHz frequency band (the region bounded by the dotted line) is not used.

Back to the description of the configuration of the wireless communication apparatus 10 with reference to FIG. 2, the analysis portion 140 receives a partial signal such as the Upper signal or the Lower signal from the filter portion 120 and analyzes the characteristics of each partial signal. The detailed configuration of the analysis portion 140 is shown in FIG. 6.

Figure 6:
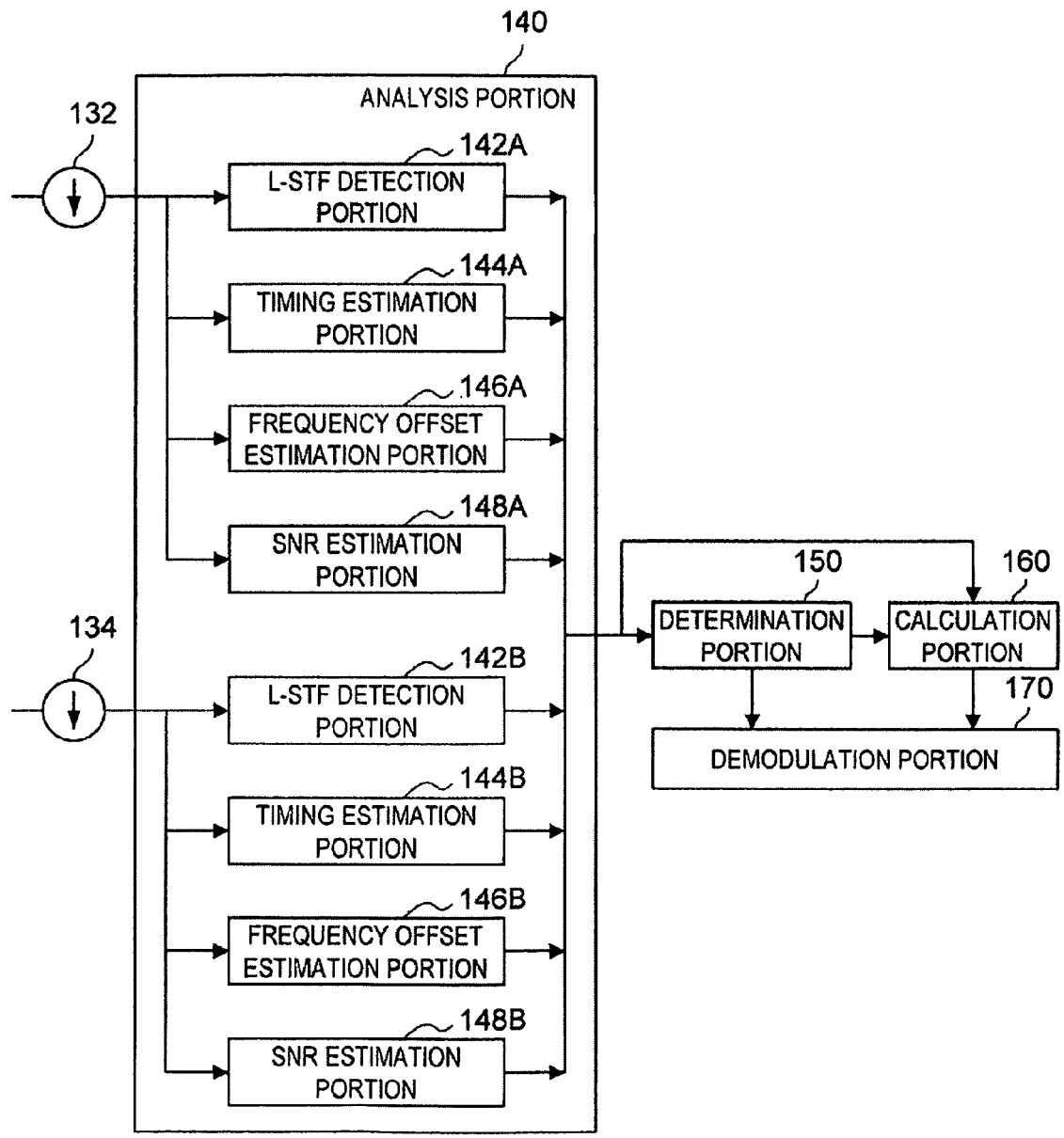
FIG. 6 is a functional block diagram showing the detailed configuration of an analysis portion.

FIG. 6 is a functional block diagram showing the detailed configuration of the analysis portion 140. As shown in FIG. 6, the analysis portion 140 includes L-STF detection portions 142A and 142B, timing estimation portions 144A and 144B, frequency offset estimation portions 146A and 146B, and SNR estimation portions 148A and 148B.

The L-STF detection portion 142A performs processing of detecting L-STF from the Upper signal which is output from the Upper filter 122. Likewise, the L-STF detection portion 142B performs processing of detecting L-STF from the Lower signal which is output from the Lower filter 124.

The timing estimation portion 144A estimates the timing to pick out an OFDM symbol in the demodulation portion 170 with the use of L-LTF which is contained in the Upper signal that is output from the Upper filter 122. Likewise, the timing estimation portion 144B estimates the timing to pick out an OFDM symbol in the demodulation portion 170 with the use of L-LTF which is contained in the Lower signal that is output from the Lower filter 124.

The frequency offset estimation portion 146A estimates the frequency offset to be used in the demodulation processing in the demodulation portion 170 with the use of L-LTF which is contained in the Upper signal that is output from the Upper filter 122. Likewise, the frequency offset estimation portion 146B estimates the frequency offset to be used in the demodulation processing in the demodulation portion 170 with the use of L-LTF which is contained in the Lower signal that is output from the Lower filter 124.

The SNR estimation portion 148A estimates the SNR (Signal-to-Noise Ratio) of the Upper signal with the use of L-LTF which is contained in the Upper signal that is output from the Upper filter 122. Likewise, the SNR estimation portion 148B estimates the SNR of the Lower signal with the use of L-LTF which is contained in the Lower signal that is output from the Lower filter 124.

The detection results and the estimation results by the L-STF detection portions 142A and 142B, the timing estimation portions 144A and 144B, the frequency offset estimation portions 146A and 146B and the SNR estimation portions 148A and 148B are output to the determination portion 150 and the calculation portion 160. In this embodiment, the timing estimation portions 144A and 144B, the frequency offset estimation portions 146A and 146B and the SNR estimation portions 148A and 148B perform the estimations regardless of the detection results of L-STF by the L-STF detection portions 142A and 142B.

The determination portion 150 determines on which band mode the radio signal received by the antenna 104 is based, with the use of the analysis result on the Upper signal and the Lower signal by the analysis portion 140.

Specifically, the determination portion 150 may determine that a band mode is the 40 MHz mode when a difference between the timing of the Upper signal which is estimated by the timing estimation portion 144A and the timing of the Lower signal which is estimated by the timing estimation portion 144B is within a setting range. Alternatively, the determination portion 150 may determine that a band mode is the 40 MHz mode when a difference between the frequency offset of the Upper signal which is estimated by the frequency offset estimation portion 146A and the frequency offset of the Lower signal which is estimated by the frequency offset estimation portion 146B is within a setting range.

Further, the determination portion 150 may determine that a band mode is the 40 MHz mode when both of the above-described differences in the demodulation information such as the timing and the frequency offset are within a setting range. If the demodulation information match between the Upper signal and the Lower signal, it is highly possible that the antenna 104 receives a radio signal based on the 40 MHz mode. Thus, the determination by the determination portion 150 is highly reliable and effective.

Furthermore, the determination portion 150 may determine that a band mode is the 40 MHz mode when the demodulation information of the Upper signal and the Lower signal match even if L-STF of the Upper signal or the Lower signal is not detected.

On the other hand, the determination portion 150 may determine a band mode based on which of the L-STF detection portion 142A or 142B has detected L-STF when a difference between the timing of the Upper signal which is estimated by the timing estimation portion 144A and the timing of the Lower signal which is estimated by the timing estimation portion 144B is outside a setting range and when L-STF is detected by either one of the L-STF detection portion 142A or 142B. For example, if L-STF is detected by the L-STF detection portion 142A only, the determination portion 150 may determine that a band mode is the 40 MHz Upper mode.

Further, the determination portion 150 may determine a band mode based on which of the L-STF detection portion 142A or 142B has detected L-STF when a difference between the frequency offset of the Upper signal which is estimated by the frequency offset estimation portion 146A and the frequency offset of the Lower signal which is estimated by the frequency offset estimation portion 146B is outside a setting range and when L-STF is detected by either one of the L-STF detection portion 142A or 142B. For example, if L-STF is detected by the L-STF detection portion 142B only, the determination portion 150 may determine that a band mode is the 40 MHz Lower mode.

The setting range of a difference in frequency offset and the setting range of a difference in timing may be set in advance or dynamically, manually or automatically. For example, the setting range of a difference in frequency offset may be 10 MHz, 100 MHz or the like, and the setting range of a difference in timing may be 0.2 μs, 0.4 μs or the like.

Furthermore, the determination portion 150 may determine a band mode based on the previous mode or the SNR of the Upper signal and the Lower signal when a difference between the demodulation information of the Upper signal and the demodulation information of the Lower signal which are analyzed by the analysis portion 140 is outside a setting range and when L-STF is detected by both of the L-STF detection portions 142A and 142B. This occurs in the case shown in FIG. 7, for example.

Figure 7:
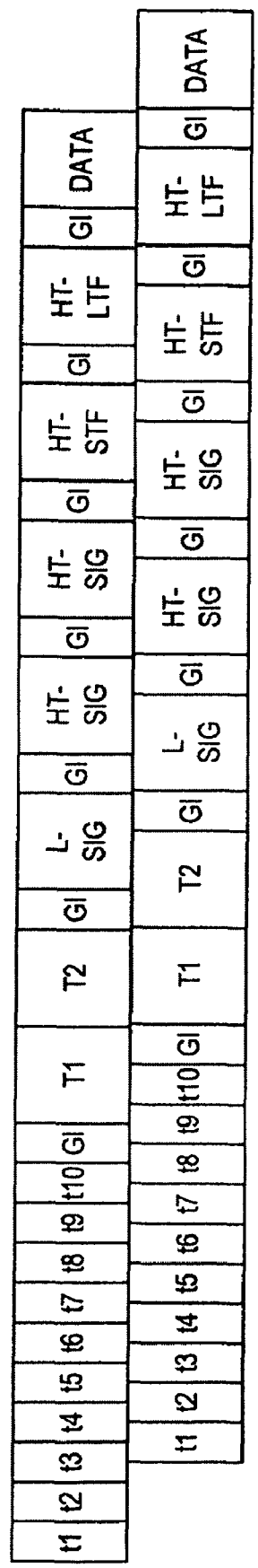
FIG. 7 is an illustration showing an example of a frame format of a radio signal which is received by an antenna.

FIG. 7 is an illustration showing an example of a frame format of a radio signal which is received by the antenna 104. The example of FIG. 7 shows the case where the antenna 104 receives the radio signal based on the 40 MHz Upper mode and the radio signal based on the 40 MHz Lower mode at substantially the same time. Because both of the Upper signal and the Lower signal are output from the filter portion 120 in this case, both of the L-STF detection portions 142A and 142B are supposed to detect L-STF. If the determination portion 150 determines a band mode based merely on the presence or absence of L-STF, it can erroneously determine that a band mode is the 40 MHz mode in the case shown in FIG. 7.

However, the radio signal based on the 40 MHz Upper mode and the radio signal based on the 40 MHz Lower mode which are received by the antenna 104 are transmitted from different wireless communication apparatus 10 through different wave paths, so that the demodulation information such as a frequency offset and a timing are expected to be different.

In light of this, the determination portion 150 of this embodiment may determine that a band mode is the band mode which corresponds to the signal with a higher SNR when a difference between the demodulation information of the Upper signal and the demodulation information of the Lower signal which are analyzed by the analysis portion 140 is outside a setting range and when L-STF is detected by both of the L-STF detection portions 142A and 142B. For example, if the SNR of the Upper signal which is estimated by the SNR estimation portion 148A is higher, the determination portion 150 may determine that a band mode is the Upper mode.

Alternatively, the determination portion 150 may determine that a band mode is the latest band mode which is determined most recently when a difference between the demodulation information of the Upper signal and the demodulation information of the Lower signal which are analyzed by the analysis portion 140 is outside a setting range and when L-STF is detected by both of the L-STF detection portions 142A and 142B.

Although the case where the determination portion 150 determines a band mode comprehensively based on the detection result of L-STF and the estimation result of demodulation information such as a timing or a frequency offset is described above, the present invention is not limited thereto. For example, the determination portion 150 may determine a band mode tentatively at the point of obtaining the detection result of L-STF by the L-STF detection portions 142A and 142B and then correct the determination on the band mode at the point of obtaining the estimation result of demodulation information.

When the determination portion 150 determines that a band mode is 40 MHz, the calculation portion 160 may average the demodulation information of the Upper signal and the demodulation information of the Lower signal which are analyzed by the analysis portion 140 and output the result as the demodulation information of the baseband signal to the demodulation portion 170.

Alternatively, when the determination portion 150 determines that a band mode is 40 MHz, the calculation portion 160 may calculate the demodulation information of the baseband signal by assigning a higher weight to the demodulation information of either one of the Upper signal and the Lower signal which has a higher SNR and output it to the demodulation portion 170. The reliability of the demodulation information which is estimated from the signal in the frequency band having a lower SNR is lower than the reliability of the demodulation information which is estimated from the signal in the frequency band having a higher SNR. Thus, if the calculation portion 160 calculates the demodulation information of the baseband signal by assigning a higher weight to the demodulation information of the Upper signal and the Lower signal as the SNR is higher as described above, it is possible to obtain the demodulation information with higher reliability.

When the determination portion 150 determines that a band mode is the 40 MHz Upper mode or the 40 MHz Lower mode, the calculation portion 160 may output the demodulation information which corresponds to the band mode that is determined by the determination portion 150 to the demodulation portion 170. For example, if the determination portion 150 determines that a band mode is the 40 MHz Upper mode, the calculation portion 160 may select the timing which is estimated by the timing estimation portion 144A and the frequency offset which is estimated by the frequency offset estimation portion 146A and output them to the demodulation portion 170.

The demodulation portion 170 performs demodulation on the baseband signal which is output from the 40 MHz filter 126 according to the band mode which is determined by the determination portion 150 with the use of the demodulation information which is input from the calculation portion 160. For example, the demodulation portion 170 picks out the baseband signal which is output from the 40 MHz filter 126 at the timing 160 which is input from the calculation portion 160 and performs Fourier transform. Then, the demodulation portion 170 outputs a frequency component in the frequency band corresponding to the band mode which is determined by the determination portion 150 to the application portion 174. The application portion 174 may be a functional block or an externally connected device to perform prescribed processing.

The configuration of the wireless communication apparatus 10 according to the embodiment is described in the foregoing. A receiving method which is performed in the wireless communication apparatus 10 according to the embodiment is described hereinbelow with reference to FIG. 8.

Figure 8:
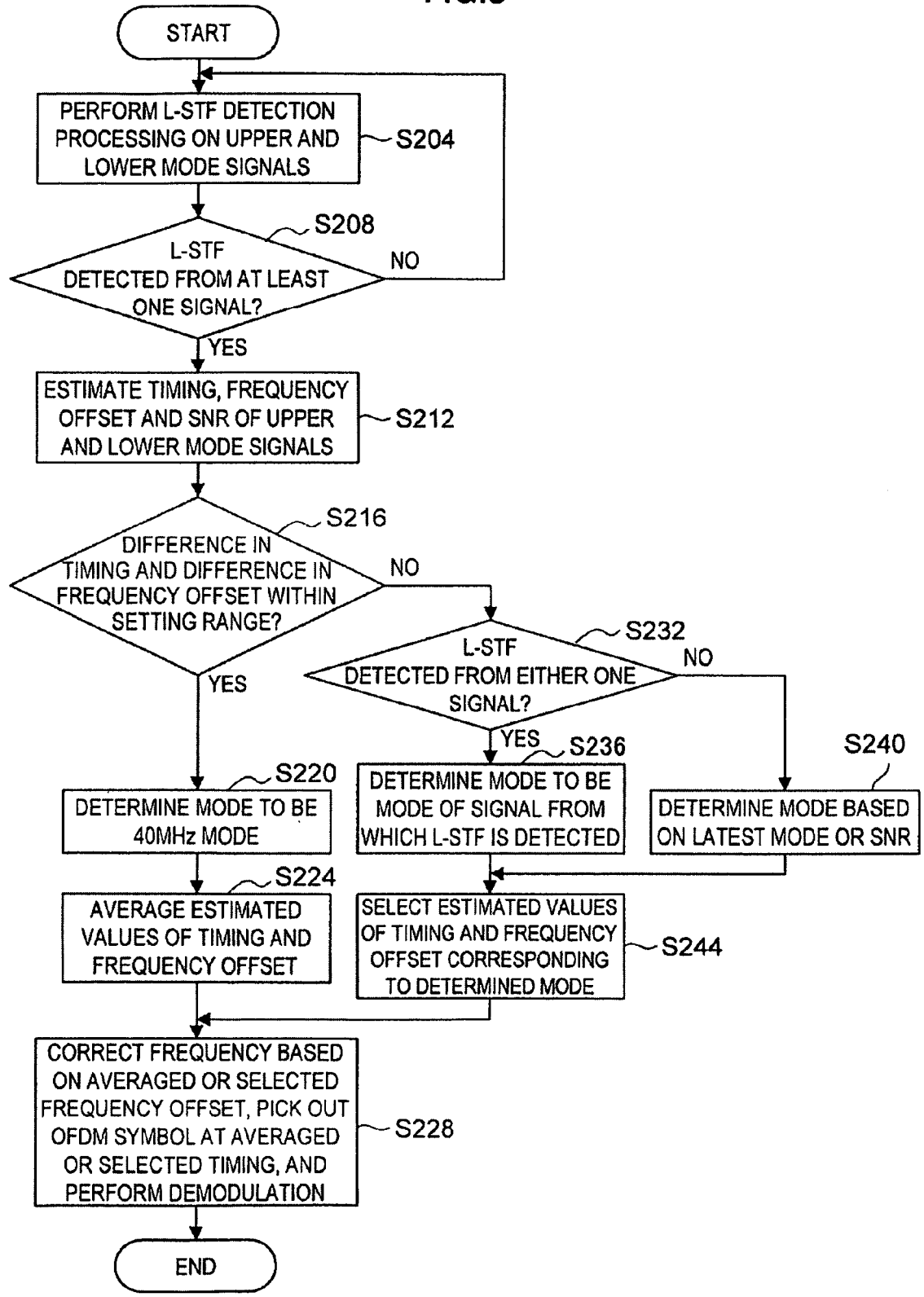
FIG. 8 is a flowchart showing the flow of a receiving method which is performed in a wireless communication apparatus according to the embodiment.

FIG. 8 is a flowchart showing the flow of the receiving method which is performed in the wireless communication apparatus 10 according to the embodiment. First, the L-STF detection portion 142A of the wireless communication apparatus 10 performs processing of detecting L-STF from the Upper signal which is output from the Upper filter 122, and the L-STF detection portion 142B performs processing of detecting L-STF from the Lower signal which is output from the Lower filter 124 (S204).

If L-STF is detected from at least one of the Upper signal and the Lower signal in S204 (S208), the analysis portion 140 estimates the timing, frequency offset and SNR of each of the Upper signal and the Lower signal (S212).

Then, the determination portion 150 determines whether a difference in timing and a difference in frequency offset between the Upper signal and the Lower signal which are analyzed by the analysis portion 140 are within a setting range (S216). If the difference in timing and the difference in frequency offset are within a setting range, the determination portion 150 determines that a band mode is the 40 MHz mode (S220).

After that, the calculation portion 160 averages the estimated values of the timing and the estimated values of the frequency offset of the Upper signal and the Lower signal and outputs the result to the demodulation portion 170 (S224). Then, the demodulation portion 170 corrects the frequency of the signal which is output from the 40 MHz filter 126 based on the estimated value of the frequency offset which is averaged by the calculation portion 160, picks out an OFDM symbol from the signal with the corrected frequency at the estimated value of the timing which is averaged by the calculation portion 160 and performs demodulation (S228).

On the other hand, if the determination portion 150 determines that the difference in timing and the difference in frequency offset are outside a setting range in S216, the determination portion 150 determines whether L-STF is detected from either one of the Upper signal or the Lower signal (S232). If L-STF is detected from the Upper signal only, the determination portion 150 determines that a band mode is the 40 MHz Upper mode, and if L-STF is detected from the Lower signal only, the determination portion 150 determines that a band mode is the 40 MHz Lower mode (S236). On the other hand, if L-STF is detected from both of the Upper signal and the Lower signal, the determination portion 150 determines a band mode based on the latest band mode or SNR (S240).

After that, the calculation portion 160 selects the estimated value of the timing and the estimated value of the frequency offset that correspond to the band mode which is determined by the determination portion 150 from the estimated values of the timing and the estimated values of the frequency offset of the Upper signal and the Lower signal which are input from the analysis portion 140 and outputs them to the demodulation portion 170 (S244).

Then, the demodulation portion 170 corrects the frequency of the signal which is output from the 40 MHz filter 126 based on the estimated value of the frequency offset which is selected by the calculation portion 160, picks out an OFDM symbol from the signal with the corrected frequency at the estimated value of the timing which is selected by the calculation portion 160 and performs demodulation (S228). After that, the demodulation portion 170 outputs only the frequency component that corresponds to the band mode which is determined by the determination portion 150.

As described in the foregoing, the wireless communication apparatus 10 according to the first embodiment of the present invention determines a band mode not only based on whether L-STF is detected from an Upper signal and a Lower signal but also based on whether a difference in each demodulation information of the Upper signal and the Lower signal is within a setting range. If the difference in the demodulation information of the Upper signal and the Lower signal which is estimated by the analysis portion 140 is within a setting range, it is likely that the Upper signal and the Lower signal are in one whole unit. It is therefore possible to determine a band mode more accurately if the determination portion 150 operates based on whether a difference in demodulation information of an Upper signal and a Lower signal is within a setting range as described above.

Second Embodiment

The second embodiment of the present invention is described hereinafter. According to the first embodiment of the present invention, the filter portion 120 includes a filter to remove either positive or negative frequency component, such as the Upper filter 122 and the Lower filter 124. The filter to remove either positive or negative frequency component is complicated in configuration compared with a filter to pass symmetrical frequency characteristics, such as the 40 MHz filter 126.

In light of the foregoing, a wireless communication apparatus 14 according to the second embodiment of the present invention has been invented. The wireless communication apparatus 14 of the embodiment enables the simplification of the configuration of the filter to be placed in the wireless communication apparatus 14. The configuration of the wireless communication apparatus 14 is described hereinafter with reference to FIG. 9. The configuration of the wireless communication apparatus 14 is common to the configuration of the wireless communication apparatus 10 according to the first embodiment in many ways, and differences between them are mainly described hereinbelow.

Figure 9:
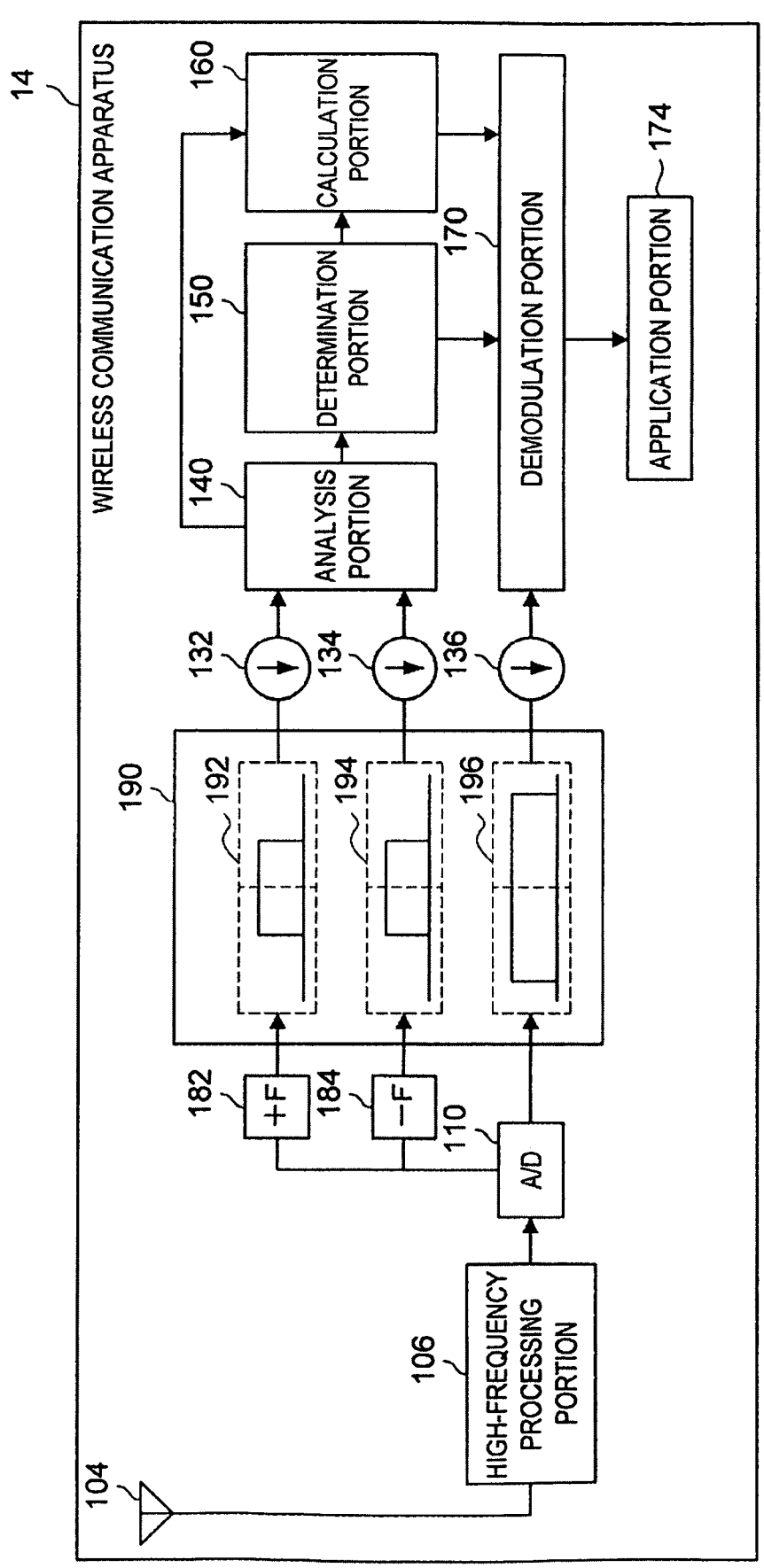
FIG. 9 is a functional block diagram showing the configuration of a wireless communication apparatus according to the second embodiment of the present invention.

FIG. 9 is a functional block diagram showing the configuration of the wireless communication apparatus 14 according to the second embodiment of the present invention. As shown in FIG. 9, the wireless communication apparatus 14 includes an antenna 104, a high-frequency processing portion 106, an A/D conversion portion 110, a decimator 132, a decimator 134, a decimator 136, an analysis portion 140, a determination portion 150, a calculation portion 160, a demodulation portion 170, an application portion 174, a plus shifter 182, a minus shifter 184 and a filter portion 190.

The plus shifter 182 shifts the frequency band of the baseband signal which is output from the A/D conversion portion 110 to the plus side by 10 MHz, so that the center frequency of the baseband signal in the 20 MHz Lower mode becomes approximately 0 MHz. Thus, when the baseband signal in the 20 MHz Upper mode is input to the plus shifter 182, the bandwidth of 20 MHz with the center frequency of approximately 0 MHz ceases to include the signal component.

The minus shifter 184 shifts the frequency band of the baseband signal which is output from the A/D conversion portion 110 to the minus side by 10 MHz, so that the center frequency of the baseband signal in the 20 MHz Upper mode becomes approximately 0 MHz. Thus, when the baseband signal in the 20 MHz Lower mode is input to the minus shifter 184, the bandwidth of 20 MHz with the center frequency of approximately 0 MHz ceases to include the signal component.

The filter portion 190 includes a 20 MHz filter 192, a 20 MHz filter 194 and a 40 MHz filter 196. The 20 MHz filter 192 and the 20 MHz filter 194 are filters to extract and output the signal component in the bandwidth of 20 MHz with the center frequency of approximately 0 MHz.

The 20 MHz filter 192 receives the baseband signal of which frequency is shifted to the plus side by the plus shifter 182. Thus, the 20 MHz filter 192 outputs the signal component which has been included in the frequency band that is used in the 40 MHz Lower mode as a Lower signal. On the other hand, the 20 MHz filter 194 receives the baseband signal of which frequency is shifted to the minus side by the minus shifter 184. Thus, the 20 MHz filter 194 outputs the signal component which has been included in the frequency band that is used in the 40 MHz Upper mode as a Lower signal.

The analysis portion 140, the determination portion 150, the calculation portion 160 and the demodulation portion 170 may determine a band mode based on the Lower signal which is output from the 20 MHz filter 192 and the Upper signal which is output from the 20 MHz filter 194 and demodulate the baseband signal as in the first embodiment.

As described above, the wireless communication apparatus 14 of this embodiment can determine a band mode without the need for a filter to remove either positive or negative frequency component, thereby facilitating the configuration.

Third Embodiment

As described in the foregoing, according to the first embodiment and the second embodiment of the present invention, a band mode is determined based on a difference between the information that is obtained from an Upper signal and the information that is obtained from a Lower signal. Thus, the cross-correlation between an Upper signal and a Lower signal is used in the first embodiment and the second embodiment of the present invention. On the other hand, according to a third embodiment of the present invention, a band mode is determined based on the autocorrelation of each of an Upper signal and a Lower signal. The third embodiment of the present invention is described hereinafter.

Figure 10:
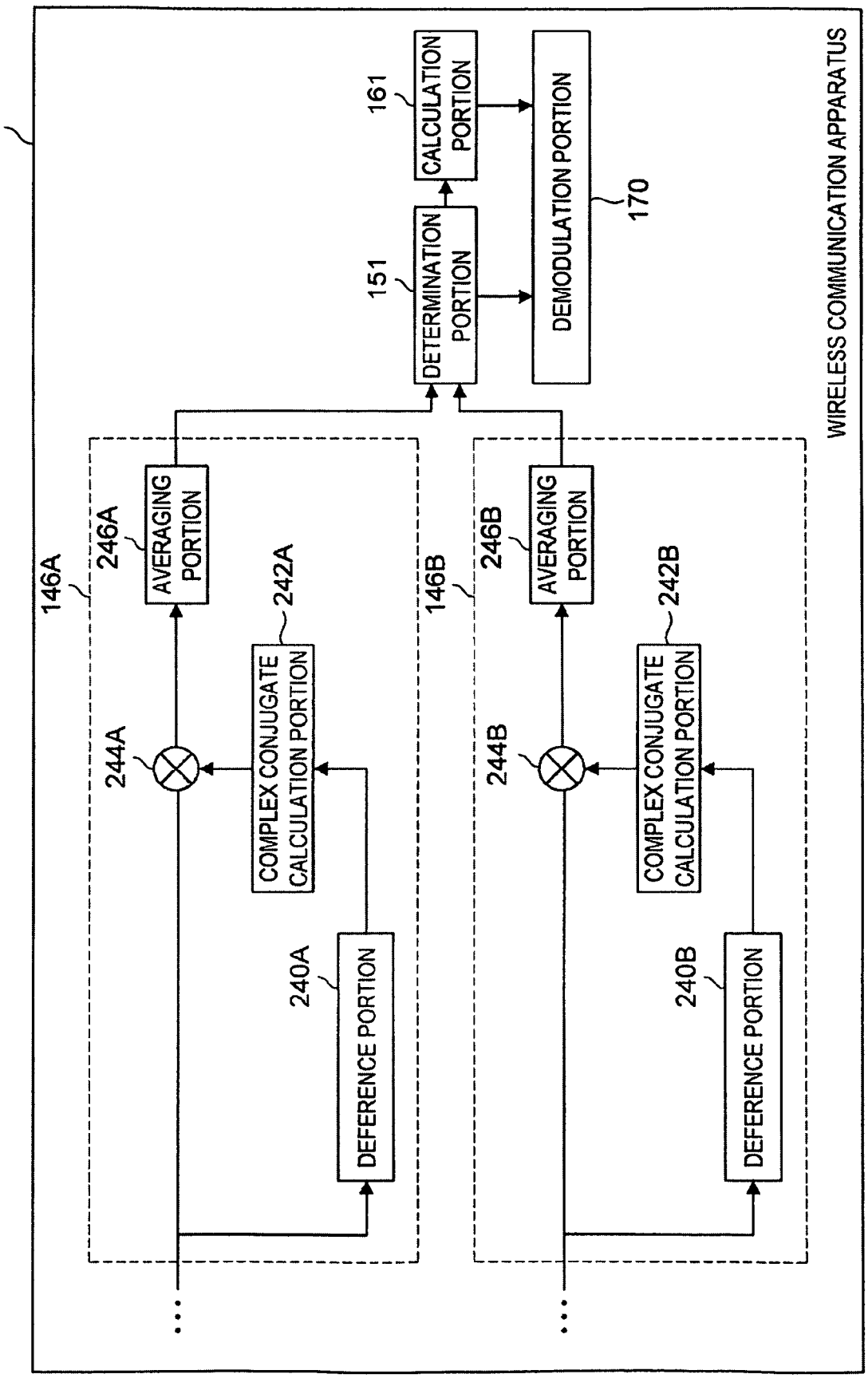
FIG. 10 is an illustration showing the configuration of a wireless communication apparatus according to the third embodiment of the present invention.

FIG. 10 is an illustration showing the configuration of a wireless communication apparatus 16 according to the third embodiment of the present invention. Referring to FIG. 10, the wireless communication apparatus 16 of this embodiment includes frequency offset estimation portions 146A and 146B, a determination portion 151, a calculation portion 161 and a demodulation portion 170. The other configuration of the wireless communication apparatus 16 according to the third embodiment is substantially the same as the configuration of the wireless communication apparatus 10 according to the first embodiment, and thus the configuration shown in FIG. 10 is mainly described in this embodiment.

Referring to FIG. 10, the frequency offset estimation portion 146A includes a deference portion 240A, a complex conjugate calculation portion 242A, a multiplication portion 244A and an averaging portion 246A, and estimates the frequency offset of an Upper signal. Similarly, the frequency offset estimation portion 146B includes a deference portion 240B, a complex conjugate calculation portion 242B, a multiplication portion 244B and an averaging portion 246B, and estimates the frequency offset of a Lower signal. Although each element is distinguished by putting a different alphabet after the same symbol in FIG. 10, the frequency offset estimation portions 146A and 146B are collectively referred to simply as the frequency offset estimation portion 146 when there is no particular need to distinguish between them.

As described in the first embodiment, L-LTF includes long training symbols T1 and T2 at a frequency of 3.2 μs. Further, L-LTF includes guard intervals GI which correspond to the latter part of the long training symbols T1 and T2. Thus, the same value is put at intervals of 3.2 μs in L-LTF. In light of this, the deference portion 240A delays an Upper signal which is output from the filter portion 120 by 3.2 μs, which is a repetition period of a signal pattern in L-LTF.

The complex conjugate calculation portion 242A calculates a complex conjugate of the Upper signal which is delayed by the deference portion 240A and outputs the result to the multiplication portion 244A. The multiplication portion 244A multiplies the current Upper signal which is output from the filter portion 120 by the complex conjugate of the Upper signal that is 3.2 μs before the current which is output from the complex conjugate calculation portion 242A. The operations in the complex conjugate calculation portion 242A and the multiplication portion 244A are described hereinafter in detail with reference to FIGS. 11 and 12.

Figure 11:
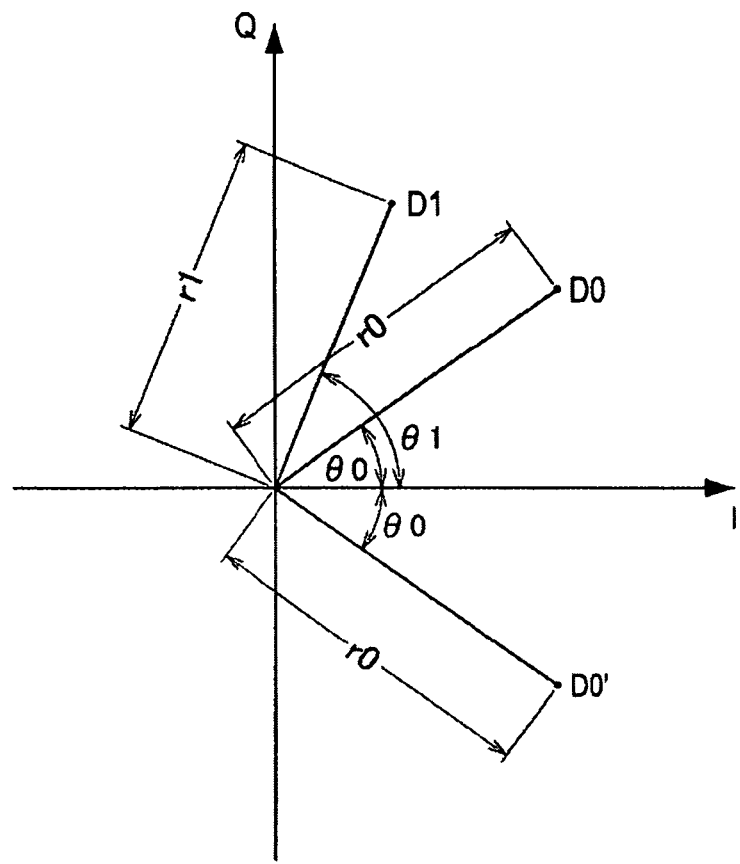
FIG. 11 is an illustration showing a specific example of calculation in a complex conjugate calculation portion and a multiplication portion.
Figure 12:
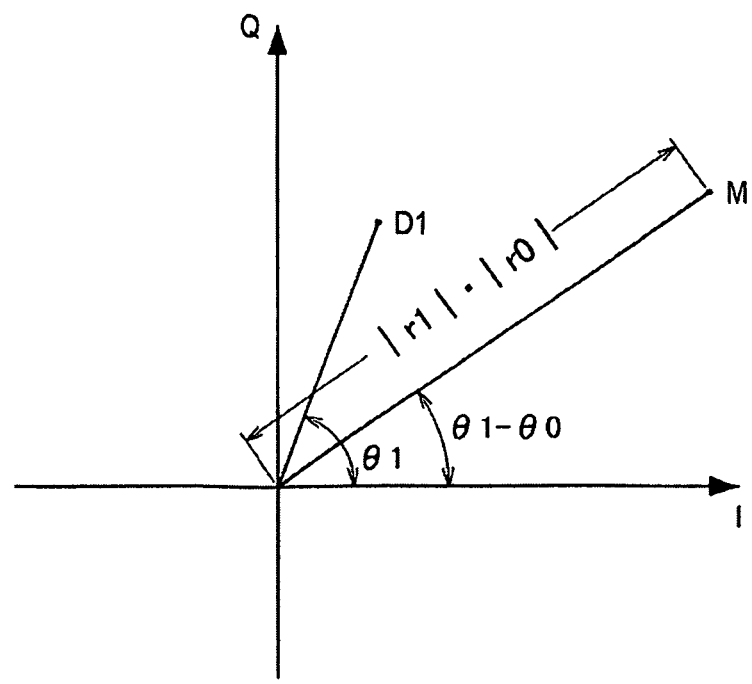
FIG. 12 is an illustration showing a specific example of calculation in a complex conjugate calculation portion and a multiplication portion.

FIGS. 11 and 12 are illustrations showing specific examples of the calculation in the complex conjugate calculation portion 242A and the multiplication portion 244A. As shown in FIG. 11, it is assumed on the I-Q plane that the Upper signal which is delayed by the deference portion 240A is at the coordinate D0, and the current Upper signal is at the coordinate D1. The coordinate D0 has a radius r0 and a center angle θ0, and the coordinate D1 has a radius r1 and a center angle θ1.

In such a case, the complex conjugate calculation portion 242A calculates the coordinate D0', which is the complex conjugate of the coordinate D0 of the Upper signal.

Then, the multiplication portion 244A multiplies the Upper signal corresponding to the coordinate D1 by the complex conjugate corresponding to the coordinate D0'. As a result, a coordinate M whose radius is the product of the absolute value of r0 and the absolute value of r1 and center angle is (θ1-θ0) is obtained.

Referring back to FIG. 10, the averaging portion 246A calculates the average value of the product which is obtained by the multiplication portion 244A as described above. For example, the averaging portion 246A calculates the following mathematical expression 1. In the expression 1, n indicates a sample number and N indicates the number of samples used for the calculation of an average value in the averaging portion 246A.

$$\frac{1}{N}\sum_{n=0}^{N-1}[|r1n|\times|r0n|\times e^{j(\theta 1n-\theta 0n)}]$$ [Expression 1]

The averaging portion 246A then calculates the root sum square of the absolute values of an I-value and a Q-value obtained by the expression 1 as an autocorrelation value. Further, the averaging portion 246A estimates the result of dividing the arc tangent of (Q-value/I-value) obtained by the expression 1 by 3.2 μs as a frequency offset.

Likewise, the deference portion 240B, the complex conjugate calculation portion 242B, the multiplication portion 244B and the averaging portion 246B which constitute the frequency offset estimation portion 146B calculate an autocorrelation value from an input Lower signal and estimate a frequency offset.

The determination portion 151 determines a band mode based on the autocorrelation values which are calculated by the frequency offset estimation portion 146A and the frequency offset estimation portion 146B.

If L-LTF is not input as an Upper signal, the value of a center angle (θ1n-θ0n) in the expression 1 differs from sample to sample, and a radial value is canceled out by a plurality of samples, so that the absolute value of an autocorrelation value is assumed to be small. On the other hand, if L-LTF is input as an Upper signal, the value of a center angle (θ1n-θ0n) in the expression 1 is approximate in each sample, so that the absolute value of an autocorrelation value is assumed to be larger compared with the case where L-LTF is not input as an Upper signal.

Thus, if the absolute value of the autocorrelation value which is calculated by the frequency offset estimation portion 146A exceeds a predetermined threshold, it is assumed that L-LTF is input as an Upper signal. Likewise, if the absolute value of the autocorrelation value which is calculated by the frequency offset estimation portion 146B exceeds a predetermined threshold, it is assumed that L-LTF is input as a Lower signal.

Therefore, the determination portion 151 determines a band mode rationally based on whether each of the absolute values of the autocorrelation values which are calculated by the frequency offset estimation portion 146A and the frequency offset estimation portion 146B exceeds a predetermined threshold. For example, the determination portion 151 may determine that a band mode is the 40 MHz mode when both of the absolute values of the autocorrelation values which are calculated by the frequency offset estimation portion 146A and the frequency offset estimation portion 146B exceed a predetermined threshold. Although the case of determining a band mode based on the absolute value of an autocorrelation value, the determination portion 151 may determine a band mode based on the square of the absolute value of an autocorrelation value. For example, the determination portion 151 may determine that a band mode is the 40 MHz mode when both of the squares of the absolute values of the autocorrelation values which are calculated by the frequency offset estimation portion 146A and the frequency offset estimation portion 146B exceed a predetermined threshold.

If a band mode is determined to be the 40 MHz mode by the determination portion 151, the calculation portion 161 may output the average value of the frequency offsets which are estimated by the frequency offset estimation portions 146A and 146B to the demodulation portion 170 as the frequency offset of a baseband signal.

Alternatively, the calculation portion 161 may calculate the frequency offset of a baseband signal by assigning the weight according to the square of the absolute value of an autocorrelation value to the frequency offsets which are estimated by the frequency offset estimation portions 146A and 146B.

As described in the foregoing, according to this embodiment, a band mode is determined by calculating the autocorrelation value of L-LTF in the frequency offset estimation portions 146A and 146B.

Figure 13:
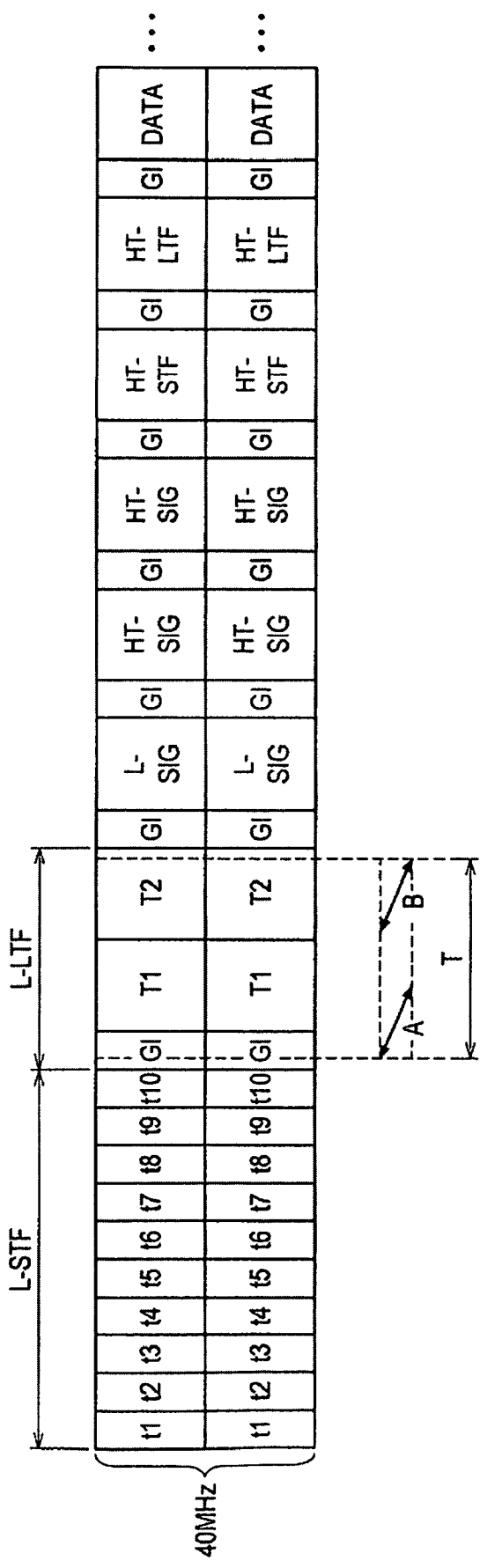
FIG. 13 is an illustration showing a calculation period of an autocorrelation value.

The period of L-LTF is not specifically known at the time of receiving L-LTF. Thus, the frequency offset estimation portions 146A and 146B may calculate an autocorrelation value within the range of the period T in FIG. 13, which is from the middle of GI to the middle of the long training symbol T2, in order to allow some extra time before and after the period of L-LTF. The arrow A and the arrow B in FIG. 13 indicate that the calculation of the correlation value of L-STF at a certain time point and L-STF after 3.2 μs from the time point is performed in L-STF within the period T.

A receiving method which is performed in the wireless communication apparatus 16 according to this embodiment is described hereinafter with reference to FIG. 14.

FIG. 14 is a flowchart showing the flow of a receiving method which is performed in the wireless communication apparatus 16 according to the third embodiment of the present invention. First, the L-STF detection portion 142A of the wireless communication apparatus 16 performs processing of detecting L-STF from the Upper signal which is output from the Upper filter 122, and the L-STF detection portion 142B performs processing of detecting L-STF from the Lower signal which is output from the Lower filter 124 (S304).

If L-STF is detected from at least one of the Upper signal and the Lower signal in S304 (S308), the analysis portion 140 estimates the timing, frequency offset and SNR of each of the Upper signal and the Lower signal (S312).

Then, the determination portion 151 determines whether a difference in timing and a difference in frequency offset between the Upper signal and the Lower signal which are analyzed by the analysis portion 140 are within a setting range (S316). Further, the determination portion 151 determines whether both of the autocorrelation values which are calculated in the estimation of the frequency offsets in the frequency offset estimation portions 146A and 146B exceed a threshold (S316). If the difference in timing and the difference in frequency offset are within a setting range and both autocorrelation values exceed a threshold, the determination portion 151 determines that a band mode is the 40 MHz mode (S320).

After that, the calculation portion 161 averages (or weighted-averages) the estimated values of the timing and the estimated values of the frequency offset of the Upper signal and the Lower signal and outputs the result to the demodulation portion 170 (S324). Then, the demodulation portion 170 corrects the frequency of the signal which is output from the 40 MHz filter 126 based on the estimated value of the frequency offset which is averaged by the calculation portion 161, picks out an OFDM symbol from the signal with the corrected frequency at the estimated value of the timing which is averaged by the calculation portion 161 and performs demodulation (S328).

On the other hand, if the determination portion 151 determines that the difference in timing and the difference in frequency offset, or the autocorrelation values do not satisfy the predetermined conditions in S316, the determination portion 151 determines whether L-STF is detected from either one of the Upper signal or the Lower signal (S332). If L-STF is detected from the Upper signal only, the determination portion 151 determines that a band mode is the 40 MHz Upper mode. If L-STF is detected from the Lower signal only, the determination portion 151 determines that a band mode is the 40 MHz Lower mode (S336).

On the other hand, if L-STF is detected from both of the Upper signal and the Lower signal, the determination portion 151 determines a band mode based on the autocorrelation values or SNR (S340). For example, the determination portion 151 may determine a band mode to be the band mode which corresponds to the signal with a higher autocorrelation value or SNR.

After that, the calculation portion 161 selects the estimated value of the timing and the estimated value of the frequency offset that correspond to the band mode which is determined by the determination portion 151 from the estimated values of the timing and the estimated values of the frequency offset of the Upper signal and the Lower signal which are input from the analysis portion 140 and outputs them to the demodulation portion 170 (S344).

Then, the demodulation portion 170 corrects the frequency of the signal which is output from the 40 MHz filter 126 based on the estimated value of the frequency offset which is selected by the calculation portion 161, picks out an OFDM symbol from the signal with the corrected frequency at the estimated value of the timing which is selected by the calculation portion 161 and performs demodulation (S328). After that, the demodulation portion 170 outputs only the frequency component that corresponds to the band mode which is determined by the determination portion 151.

It should be understood by those skilled in the art that various modifications, combinations, sub-combinations and alterations may occur depending on design requirements and other factors insofar as they are within the scope of the appended claims or the equivalents thereof.

Further, it is not necessary to perform each step in the processing of the wireless communication apparatus 10, 14 and 16 in chronological order according to the sequence shown in the flowchart, and the processing which is performed in parallel or individually (e.g. parallel processing or object processing) may be included.

Furthermore, it is possible to create a computer program that causes the hardware such as CPU, ROM or RAM which are built in the wireless communication apparatus 10, 14 and 16 to perform the equal function to each configuration of the wireless communication apparatus 10, 14 and 16 described above. Further, a storage medium which stores such the above computer program may be provided. Furthermore, each functional block which is shown in the functional block diagram of FIG. 2, 6, 9 or 10 may be implemented by hardware, thereby achieving the series of processing on hardware.

What is claimed is:

1. A receiving apparatus, comprising:
   a receiving portion to receive a radio signal generated based on one baseband signal of a baseband signal having a prescribed frequency band and a baseband signal having a partial frequency band being a part of the prescribed frequency band;
   a signal processing portion to generate the baseband signal by converting a frequency of the radio signal;
   a filter portion to output a plurality of partial signals, each having a frequency component of each partial frequency band extracted from the baseband signal generated by the signal processing portion;
   an analysis portion to analyze characteristics of each partial signal of the plurality of partial signals output from the filter portion; and
   a determination portion to determine that the baseband signal generated by the signal processing portion is a baseband signal having the prescribed frequency band if a difference in demodulation information of the plurality of partial signals analyzed by the analysis portion is within a setting range.

2. The receiving apparatus according to claim 1, wherein the analysis portion analyzes demodulation information of each partial signal of the plurality of partial signals, the demodulation information to be used for demodulation of the baseband signal in a demodulator.

3. The receiving apparatus according to claim 2, further comprising:
   a calculation portion to calculate demodulation information of the baseband signal having the prescribed frequency band by averaging the demodulation information of the plurality of partial signals analyzed by the analysis portion.

4. The receiving apparatus according to claim 2, wherein the analysis portion further analyzes a SNR (Signal-to-Noise Ratio) of each partial signal, and
   the receiving apparatus further includes a calculation portion to calculate demodulation information of the baseband signal having the prescribed frequency band by assigning a higher weight to the demodulation information of the plurality of partial signals analyzed by the analysis portion as a partial signal has a higher SNR.

5. The receiving apparatus according to claim 2, wherein the analysis portion is capable of detecting a prescribed synchronizing signal from the partial signal, and
   the determination portion determines that the baseband signal generated by the signal processing portion is a baseband signal having the partial frequency band corresponding to one partial signal if a difference in the demodulation information of the plurality of partial signals analyzed by the analysis portion is outside a setting range and a synchronizing signal is detected from the one partial signal only.

6. The receiving apparatus according to claim 2, wherein the analysis portion further analyzes a SNR (Signal-to-Noise Ratio) of each partial signal, and
   the determination portion determines a frequency band of the baseband signal generated by the signal processing portion based on the SNR or a latest frequency band determined by the determination portion if a difference in the demodulation information of the plurality of partial signals analyzed by the analysis portion is outside a setting range and a synchronizing signal is detected from two or more partial signals.

7. The receiving apparatus according to claim 1, wherein the analysis portion calculates a frequency offset by analyzing a correlation value of each partial signal with the partial signal before a prescribed time, and
   the receiving apparatus further includes a determination portion to determine that the baseband signal generated by the signal processing portion is a baseband signal having the prescribed frequency band if each of absolute values of the correlation values or squares of absolute values of the correlation values of the plurality of partial signals exceeds a threshold.

8. The receiving apparatus according to claim 7, further comprising:
   a calculation portion to calculate a frequency offset of the baseband signal having the prescribed frequency band by assigning a weight according to a square of an absolute value of the correlation value to a frequency offset of each partial signal calculated by the analysis portion if the determination portion determines that each of absolute values of the correlation values or squares of absolute values of the correlation values of the plurality of partial signals exceeds a threshold.

9. A program for causing a computer to serve as a receiving apparatus comprising:
   a receiving portion to receive a radio signal generated based on one baseband signal of a baseband signal having a prescribed frequency band and a baseband signal having a partial frequency band being a part of the prescribed frequency band;
   a signal processing portion to generate the baseband signal by converting a frequency of the radio signal;
   a filter portion to output a plurality of partial signals, each having a frequency component of each partial frequency band extracted from the baseband signal generated by the signal processing portion;

an analysis portion to analyze characteristics of each partial signal of the plurality of partial signals output from the filter portion; and a determination portion to determine that the baseband signal generated by the signal processing portion is a baseband signal having the prescribed frequency band if a difference in demodulation information of the plurality of partial signals analyzed by the analysis portion is within a setting range.

10. A receiving method comprising the steps of:

receiving a radio signal generated based on one baseband signal of a baseband signal having a prescribed frequency band and a baseband signal having a partial frequency band being a part of the prescribed frequency band;

generating the baseband signal by converting a frequency of the radio signal;

outputting a plurality of partial signals, each having a frequency component of each partial frequency band extracted from the baseband signal;

analyzing characteristics of each partial signal of the plurality of partial signals; and determining that the baseband signal is a baseband signal having the prescribed frequency band if a difference in demodulation information of the plurality of partial signals analyzed is within a setting range.

* * * * *